US007057358B2

(12) United States Patent
Seibt et al.

(10) Patent No.: US 7,057,358 B2
(45) Date of Patent: Jun. 6, 2006

(54) ELECTRONIC BALLAST AND OPERATING METHOD FOR A GAS DISCHARGE LAMP

(75) Inventors: Marco Seibt, Ruhpolding (DE);
Werner Ludorf, Ruhpolding (DE);
Stefan Zudrell-Koch, Dornbirn (AT);
Günter Marent, Bartholomaeberg (AT)

(73) Assignee: TridonicAtco GmbH & Co. KG, Dornbirn (AT)

( * ) Notice: Subject to any disclaimer, the term of this patent is extended or adjusted under 35 U.S.C. 154(b) by 15 days.

(21) Appl. No.: 10/870,062

(22) Filed: Jun. 18, 2004

(65) Prior Publication Data

US 2005/0017655 A1 Jan. 27, 2005

Related U.S. Application Data

(63) Continuation of application No. PCT/EP02/14669, filed on Dec. 20, 2002.

(30) Foreign Application Priority Data

Dec. 20, 2001 (DE) .................................. 101 63 032

(51) Int. Cl.
*H05B 41/16* (2006.01)
*H05B 37/02* (2006.01)
(52) U.S. Cl. .................... 315/246; 315/291; 315/307
(58) Field of Classification Search ........ 315/224–226, 315/246–247, 283, 291, 294, 299, 307–308, 315/360, DIG. 5, DIG. 7; 323/355; 363/34, 363/37
See application file for complete search history.

(56) References Cited

U.S. PATENT DOCUMENTS

| 5,262,701 | A | * | 11/1993 | Derra et al. ................ 315/224 |
| 5,569,984 | A | * | 10/1996 | Holtslag ..................... 315/307 |
| 5,612,857 | A | * | 3/1997 | Ishikawa ................. 363/21.02 |
| 5,623,187 | A | * | 4/1997 | Caldeira et al. ............ 315/307 |
| 5,705,897 | A | | 1/1998 | Hanazaki et al. ........... 315/307 |
| 5,748,460 | A | | 5/1998 | Ishikawa ..................... 363/21 |
| 5,793,623 | A | * | 8/1998 | Kawashima et al. ..... 363/56.05 |
| 2005/0035729 | A1 | * | 2/2005 | Lev et al. ................... 315/291 |

FOREIGN PATENT DOCUMENTS

JP 08 191567 A 2/1991

OTHER PUBLICATIONS

U. Tietze and Ch. Schenk, "Halbleiterschaltungstechnik", 1991, 9$^{th}$ Edition, pp. 561-586.

* cited by examiner

*Primary Examiner*—Thuy Vinh Tran
(74) *Attorney, Agent, or Firm*—Fitzpatrick, Cella, Harper & Scinto

(57) ABSTRACT

In an electronic ballast the output d.c. voltage (U) of a PFC intermediate circuit (3) is to be regulated. The intermediate circuit (3) has a clocked switch (S) which is controlled by a regulation circuit (7). The regulation circuit (7) includes two counters (Z1, Z2). The counter (Z1) has a greater number of count stages than the counter (Z2). The counter (Z1) is counted upwards or downwards in dependence upon the regulation difference. The counter (Z2) is repeatedly counted only in one direction and for example reset by a reset signal. By comparing the counts of corresponding count stages of the two counters (Z1) and (Z2) in a comparator, the switch on time ($t_{on}$) for the clock switch (S) is determined.

15 Claims, 7 Drawing Sheets

Explanation:

Scheme with current zero-crossing recognition and reset of Z2 with an additional counter Scheme with current zero-crossing recognition and reset of Z2 by self signal Scheme with reset of Z2 with additional counter, without current zero-crossing recognition Dead Time    No Dead Time at voltage maximum

ELECTRONIC BALLAST AND OPERATING METHOD FOR A GAS DISCHARGE LAMP

CROSS REFERENCE TO RELATED APPLICATIONS

This is a Continuation of application PCT/EP02/14669 filed on Dec. 20, 2002, and published in German but not English as WO 03/055278 A1 on Jul. 3, 2003, the priority of which is claimed herein (35 U.S.C. §120) and which claims priority of German Application No. 101 63 032.8 filed Dec. 20, 2001, the priority of which is also claimed herein (35 U.S.C. §119).

BACKGROUND OF THE INVENTION

1. Field of the Invention

The invention relates to an electronic ballast and to an operating method for a gas discharge lamp, having a d.c. voltage converter, fed from a d.c. voltage source, with clocked switch and regulated output voltage, an inverter fed from the output d.c. voltage of the d.c. voltage converter, and a regulation circuit to which there is delivered a desired value signal and an actual value signal corresponding to the output d.c. voltage of the d.c. voltage converter, and which generates as setting value signal pulse width modulated switch-on pulses for the clocked switch.

2. Description of the Related Art

Such an electronic ballast is for example known from U.S. Pat. No. 5,705,897.

The d.c. voltage source for such an electronic ballast is normally a rectifier connected to the mains. The d.c. voltage converter then forms a PFC intermediate circuit (PFC=power factor correction), the task of which is to appear with respect to the mains as a quasi ohmic load. At the input of the d.c. voltage converter there lie the mains half-waves. The input current is formed by pulses the amplitudes of which likewise appear as sinusoidal half-waves. Between the half-waves of the input voltage of the input voltage and the half-waves formed by the amplitudes of the current pulses there is no phase displacement, so that a reactive loading of the mains is avoided and the generation of disruptive harmonics is reduced to a permissible level.

There are known different types of d.c. voltage converters which are for example described in the book by U. Tietze and Ch. Schenk "Semiconductor Circuit Techniques" ("Halbleiterschaltungstechnik"), publisher: Springer-Verlag, 1991, 9th Edition, pages 561–586. It is common to all that they include at least one clocked switch and at least two storage elements. For electronic ballasts there is mostly employed an upwards converter type, which—seen from the input to the output—consists of a charging choke in a first longitudinal branch, a clocked switch in a first transverse branch, a diode in a second longitudinal branch and a storage capacitor in a second transverse branch.

There has long been the tendency to produce electronic ballasts—as far as possible—using integrated circuit technology, i.e. as ASICs (application specific integrated circuits).

SUMMARY OF THE INVENTION

The object of the invention is to indicate a proposal for the regulation circuit for the clocked switch which is likewise suitable for realization within the framework of an ASIC.

This object is achieved in accordance with the invention by means of the features of the independent claims. The dependent claims further develop, in advantageous manner, the central concept of the invention.

In accordance with one aspect of the invention the regulation circuit includes a first and a second counter. The bit width of the first counter is at least equal to the bit width of the second counter. The first counter is one with reversible count direction, which in dependence upon whether the actual value signal is greater or smaller than the desired value signal counts in the one or in the other direction, possibly with variable step size. The second counter carries out at the time point of the switching-on of the switch a new counting procedure. The output signals of the two counters are compared in a (digital) comparator (possibly after scaling) for obtaining the setting value signal. The pulse width of the switch-on pulse for the clocked switch is determined through the temporal spacing between a start signal for a new count procedure of the second counter and the attainment of equality of the two counters compared with one another.

The counters and the comparator are standard digital circuitry components which in line with the object to be achieved allow themselves well to be incorporated into an ASIC design.

As d.c. voltage converter for the present purpose there is suitable a per se known upwards converter which—considered from the input to the output—has a storage choke in a first series branch, a switch in a first transverse branch, a diode in a second longitudinal branch and a charge capacitor in a second transverse branch.

Starting from the employment of the above indicated upwards converter an expedient further development of the invention may further consist in that there is connected with the second counter a zero crossing detector for the d.c. current flowing through the storage choke of the d.c. voltage converter, which zero crossing detector can trigger the reset signal for the second counter when the reducing d.c. current flowing through the storage choke, with open switch, reaches the zero point.

A further configuration of the electronic ballast in accordance with the invention can consist in that the actual value signal is generated by means of a d.c. voltage sensor which measures the output d.c. voltage of the d.c. voltage converter, in that the actual value signal and the desired value signal are delivered in analog form to the two inputs of a 1-bit A/D converter, which compares these two signals and on the output side generates the digital value ONE if the actual value signal is greater than or equal to the setting value signal, and generates the digital value ZERO when the actual value signal is smaller than the desired value signal, or vice versa, in that the output of the 1-bit-A/D converter is connected with the first counter, and in that the first counter counts upwards when the digital value ZERO is delivered thereto and counts downwards when the digital value ONE is delivered thereto, or vice versa. In generalization of this concept, the deviation between the actual value signal and the desired value signal can also be processed as n-bit information, whereby the step size of the counter then varies in dependence upon the level of the regulation deviation.

The invention further relates to a method of operating an electronic ballast for a gas discharge lamp, having a d.c. voltage converter, with clocked switch and regulated output d.c. voltage, fed from a d.c. voltage source, an inverter fed from the output d.c. voltage of the d.c. voltage converter, and a regulation circuit to which there is supplied a desired value signal and an actual value signal corresponding to the output d.c. voltage of the d.c. voltage converter, and which generates switch-on pulses for the clocked switch. Thereby, the method has the following steps:

comparison of the actual value signal with the desired value signal for generating a digital difference signal;

delivery of the digital difference signal to the counter input of a first counter, the count direction of which depends upon the sign of the digital difference signal;

comparison of the count, or of the scaled count, of the first counter with the count of a second counter, which in each case begins a counting procedure in response to a start or a RESET signal;

switching-on of the switch and start of the second counter in each case after expiry of a predetermined time or when the current through a charge coil of the d.c. voltage converter reaches the zero point; and switching-off of the switch when the count, or the scaled count, of the first counter is equal to the count of the second counter.

In accordance with a still further aspect of the present invention, the actual value signal is compared with the desired value signal for generating a digital difference signal. The digital difference signal is digitally filtered. The value of the filtered difference signal is compared with a count of a second counter which in each case begins a counting procedure in response to a start or RESET signal. The switch (S) is in each case switched on after expiry after the predetermined time or if the current through a charge coil (L) of the d.c. voltage converter reaches the zero point. At the same time the count procedure of the second counter is started. The switch is switched off when the value of the filtered difference signal is equal to the count of the second counter.

BRIEF DESCRIPTION OF THE DRAWINGS

Exemplary embodiments of the invention are described below with reference to the drawings. In the drawings.

DETAILED DESCRIPTION OF THE PREFERRED EMBODIMENTS

Figure 1:
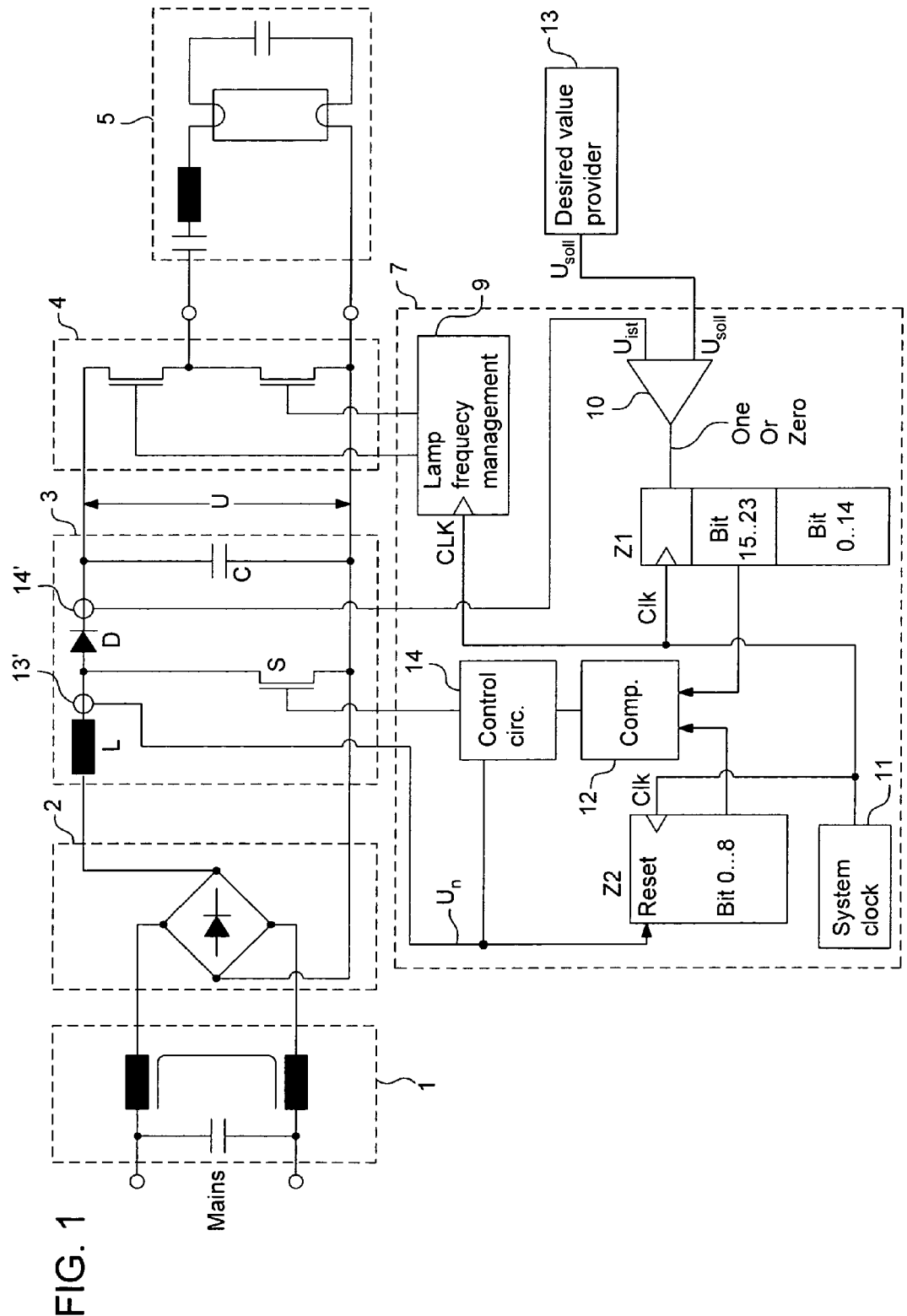
FIG. 1 is a block circuit diagram of an electronic ballast having a first embodiment of the regulation circuit in accordance with the invention.

The ballast shown in FIG. 1 has the circuitry components explained below. An HF (high frequency) filter 1 is connected with the mains and delivers a filtered mains voltage to a rectifier circuit 2. The rectifier circuit 2 generates, at its output, half-waves of the mains voltage which are delivered to the d.c. voltage converter 3. The d.c. voltage converter 3 generates, at its output, a voltage U which by means of regulation is held constant independently of changes of the load. The output d.c. voltage U of the d.c. voltage converter 3 is delivered to an inverter 4 to which a load 5 is connected. The load 5 contains a gas discharge lamp to be operated with the electronic ballast.

It is remarked in advance that all components of the regulation means described in more detail below can be realized by means of software, hardware or a hybrid solution. In particular, a (slow) counter Z1 can be implemented by means of software. Another counter Z2 may preferably be formed by means of a hardware module.

Figure 2A:
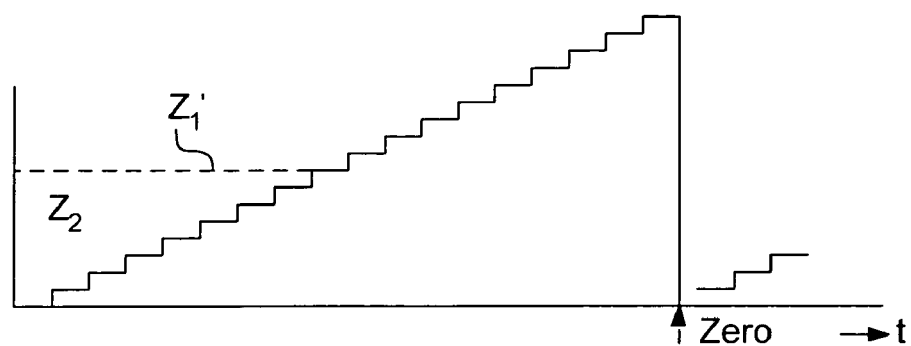
FIG. 2 contains time diagrams
a) of the counting behavior of a second counter in the diagram of FIG. 1,
b) of the development of the current flowing through a charging choke in the diagram of FIG. 1,
c) of a reset signal ($U_n$) for the second counter,
d) of switch-on pulses for a clocked switch in the diagram of FIG. 1, and
e) of system clock pulses which are delivered to the counters.
Figure 2B:
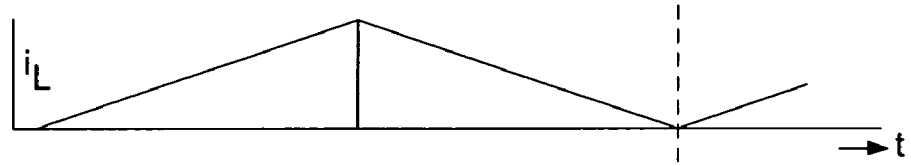
Figure 2C:
Figure 2D:

The d.c. voltage converter 3 consists of a charge choke L in a first longitudinal branch, a clocked switch S in a first transverse branch, a diode D in a second longitudinal branch and a storage capacitor C in a second transverse branch. The clocked switch S is switched to be conductive with pulse-width modulated switch-on pulses. The switch-on pulses are shown in FIG. 2(d). The switch-on time is there designated by $t_{on}$. The temporal spacing between the input flanks of the switch-on pulses is designated by T.

If the switch S is switched through, there flows through the charging choke L an increasing charging current $i_L$. If the switch S is switched to be interrupted, the energy stored in the choke (charging coil) L discharges via the diode D to the storage capacitor C. In the discharging phase the current flowing through the charging choke L falls—as can be seen in FIG. 2(b)—and finally reaches the zero point.

The longer is the switch-on time $t_{on}$ of the switch in comparison to the overall time T, the higher rises the output d.c. voltage U of the d.c. voltage converter 3. If the switch-on pulses are shortened, the output d.c. voltage U falls correspondingly. Thus, by means of purposive variation of the switch-on time $t_{on}$ it is possible to maintain constant the output d.c. voltage U.

The switch-on pulse control for the clocked switch S is effected by means of the regulation circuit 7. For example there is delivered to the regulation circuit 7, from an external desired value provider 13, the analogue desired value $U_{soll}$ for the output d.c. voltage U. For generating the actual value $U_{ist}$ of the output d.c. voltage U there serves a d.c. voltage sensor 14', which measures the output d.c. voltage U of the d.c. voltage converter 3.

With a zero crossing detector 13' (for example a d.c. current sensor as illustrated, or a voltage divider) the time point is detected at which the d.c. current flowing through the charging choke L in the falling phase reaches the zero point. At this time point, the reset signal $U_n$ is generated in the present exemplary embodiment (see FIG. 2(c)). Otherwise, the zero point of the current through the charging choke can be determined also from the voltage being applied at the point 13'.

Figure 2E:
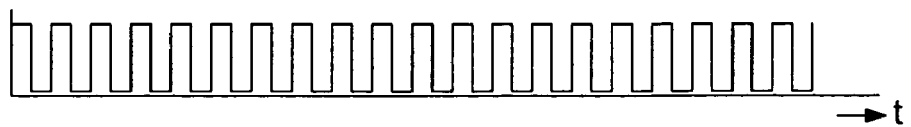

The regulation circuit 7 includes a first counter Z1 and a second counter Z2. The two counters Z1 and Z2 are connected with a system clock 11, which generates system clock pulses CLK shown in FIG. 2(e).

The second counter Z2 is operated only in the upwards count direction and has for example $2^9$ count stages, which are represented by means of the bits 0–8. The reset input of the second counter Z2 is connected in the present exemplary embodiment with a d.c. current sensor 13. When the reset signal $U_n$ appears at the reset input, the running count process of the second counter Z2 is interrupted. At the same time—as is shown in FIG. 2(a)—the second counter Z2 is reset, and a new count process is set in course. The resetting procedure of the second counter Z2 is thus effected at the time point at which the d.c. current flowing through the charging choke L in the falling phase reaches the zero point (see above).

The first counter Z1 has for example $2^{24}$ count stages, which are represented by means of the bits 0–23. It can count in both directions, that is upwards and downwards.

Further, with the first counter Z1 there is connected the output of a (here) 1-bit A/D converter 10 to the two inputs of which the analogue actual value signal $U_{ist}$ and the analogue desired value $U_{soll}$ are delivered. At the output of the 1-bit A/D converter there is issued a digital signal in the form of a ONE or ZERO. The digital value ONE is thereby generated if the actual value signal $U_{ist}$ is greater than or equal to the desired value $U_{soll}$. The digital value ZERO is correspondingly generated when the actual value signal $U_{ist}$ is smaller than the desired value signal $U_{soll}$.

When the digital value ZERO is delivered to the first counter Z1, it counts upwards. When the digital value ONE is delivered to the first counter, it counts downwards.

The counter state of the $2^9$ count stages of the second counter Z2 are compared by means of a comparator 12 with the corresponding $2^9$ higher value counter stages of the first counter Z1. The $2^9$ higher value count stages of the first counter Z1 are represented by means of the bits 15–23. The digital comparator 12 determines the time point at which the bits of the Z1 and Z2 to be compared come into agreement and reports this agreement to a control circuit 14 for the switch S. There is further delivered to the control circuit 14 the reset signal $U_n$ generated by the d.c. voltage sensor 13'. The control circuit 14 switches the switch S on, i.e. into the conductive condition, when it receives the reset signal $U_n$, and it switches the switch S off, i.e. into the blocked condition, when the comparator 12 reports the equality (agreement) of the counter states of the bits of the two counters Z1 and Z2 which are to be compared.

Control of the inverter 4 is effected via a circuit block 9 which is responsible for the lamp frequency management.

As a result of the high number of count stages of the counter Z1 the regulation frequency is relatively low, and the regulation changes are effected in small steps. In that the number of count stages of the counter Z2 is significantly lower than those of the counter Z1, an oversampling is ensured. If, for example the system clock operates with a clock frequency of 10 MHz, the switch S is switched with a switching frequency between 5 MHz and 39 kHz. The regulation frequency determined by means of the counter Z1 is, in contrast, only 75 Hz.

The lower value count stages of the counter Z1, which are represented by means of the bits 0–14, serve practically as a digital integrator. The higher value count stages, which are represented by the bits 15–23, in contrast determine the switch-on time $t_{on}$ for the switch S.

The d.c. voltage converter 3 forms a PFC intermediate circuit for the electronic ballast. It ensures that, with respect to the mains, the ballast acts as an ohmic load.

Figure 3:
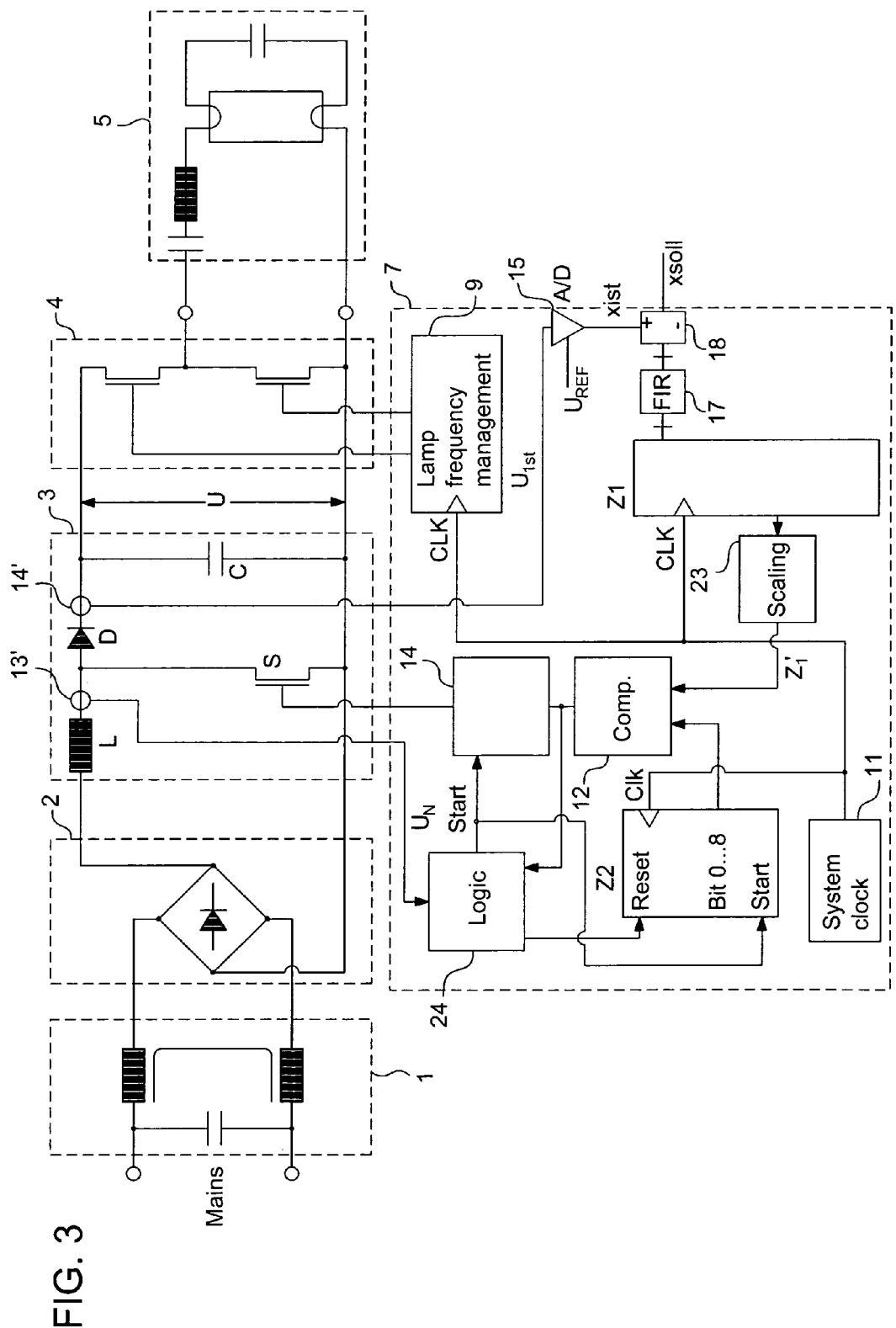
FIG. 3 a block circuit diagram of a generalized embodiment of a regulation circuit in accordance with the invention.
Figure 4:
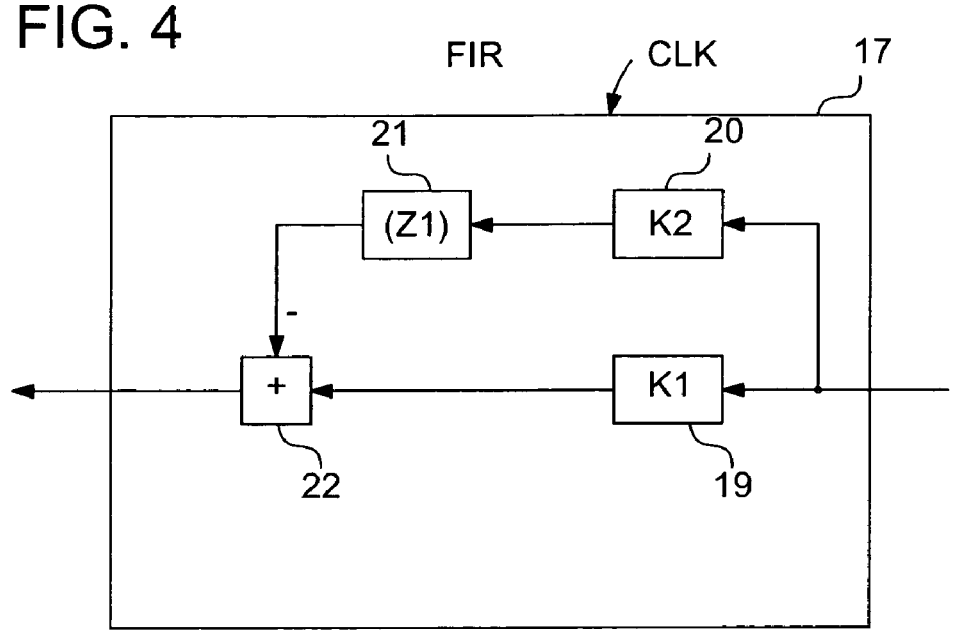
FIG. 4 an illustration to a larger scale of an FIR-filter in the circuit of FIG. 3.

FIG. 1 shows, as indicated, a specific exemplary embodiment of the switching principle in accordance with the invention, whilst FIG. 3 shows a general illustration of the concept in accordance with the invention. In FIG. 3, for a better overview, there are illustrated only elements of the regulation circuit, whereby components in FIG. 3 identical to the components shown in FIG. 1 are provided with the same reference signs.

In general in accordance with the invention, as shown in FIG. 3, the difference between the desired value $U_{REF}$ and the actual value $U_{ist}$ corresponding to the output d.c. voltage U of the d.c. voltage converter is passed on via A/D converter 15 as n-bit information $X_{ist}$. Instead of a simple comparison between desired value $U_{soll}$ and actual value $U_{ist}$ by means of the comparator provided with the circuit according to FIG. 1, there is thus now also additionally detected the height of the regulation deviation between the two input values $U_{REF}$ and $U_{ist}$ and this is taken into account in the further operation of the regulation loop. This n-bit information $X_{ist}$ is delivered to the first counter Z1 which in turn—depending upon whether the desired value $U_{REF}$ is greater than the actual value $U_{ist}$, or vice versa—counts upwards or downwards with step size proportional to the difference.

The step size of this counter Z1 is now variable and depends upon the absolute value of the difference $X_{ist}$. If there is present for example a high deviation between desired value $U_{REF}$ and actual value $U_{ist}$, the step size is thus increased since through this a more rapid adaptation of the switch-on time for the switch S is obtained. Oppositely, in the case of merely slight deviations between desired value $U_{soll}$ and actual value $U_{ist}$, the step size of the counter Z1 is reduced.

Control of the step size is effected via a digital filter, in particular an input block of the counter Z1 constituted as a so-called FIR filter (FIR=Finite Impulse Response) 17. The digital filter may also for example be an IIR (Infinite Impulse Response) filter.

The upstream FIR filter 17 is in the present exemplary embodiment a linear, temporally discreet system, the output signal of which represents the weighted sum of the current input signals and a certain number of past sample values. The concrete characteristics of the FIR filter can be set by means of appropriate selection of the weighting coefficients.

In accordance with the implementation in FIG. 3, this FIR filter 17 has an adder 18 which subtracts a predetermined digital reference value $X_{soll}$ from the delivered value $X_{ist}$. The output of the adder 18 is delivered to two proportional members 19, 20, which effect a multiplication with constants K1 and K2. The output of the proportional member 20 is delivered to a delay member 21, which delays the signal by one clock (z–1). The delayed value is then subtracted from the output value of the proportional member 19 in a further adder 22. The output value of the further adder 22 is then delivered to the count input of the first counter Z1.

Overall, the combination of the FIR filter 17 with the first counter Z1 forms a PI regulation structure. The P component is thereby attained through the combination of the differentiating effect of the delay member 21 with the integrating effect of the counter Z1. The I component is correspondingly constituted by means of the proportional member 19 and the counter Z1.

The data format of the input of the FIR filter 17 is usually smaller than that of the output. At least at the output, a fixed point format is preferably employed.

The output value of the counter Z1 is divided, for example by a whole number factor, by means of a scaling member 23 and the result Z1' passed on as first input signal to the comparator 12. If the whole number factor is a power of "2", the scaling corresponds to the reading out of the higher value bits in FIG. 1. Other whole number values could also be used but also floating point values may be employed. Usually, the scaling factor would be greater than 1.

Beyond this it is shown in FIG. 3 that by means of a logic unit 24 the resetting of the counter Z2, the switch-on process of the switch S (by means of the signal START in FIG. 3) and the zero crossing of the current through the charge coil can be selected independently of one another.

For this purpose (optionally) the output signal of the zero point detector 13' is delivered to the logic unit 24. To it there is also delivered the output signal of the comparator 12. The logic unit 24 generates on the one hand the RESET signal for the counter Z2 and the start signal START for the control unit 14 (for example a flip-flop), in response to which START signal the control unit 14 switches on the switch S (beginning of the switch-on pulse). The reset procedure of the counter Z2 can if appropriate be effected even before the start procedure of the counter Z2 and thus independently of the start of the count procedure of the counter Z2. In this case, the count procedure of the counter Z2 (increasing from zero) is likewise initiated by means of the signal start of the logic unit 24.

In principle, the logic unit 24 can issue the start signal START for the switching-on of the switch S upon detection of the zero crossing of the current through the charge coil and/or upon expiry of a defined time (for example generated by means of a time base or a further counter of the logic unit 24).

Figure 5A:
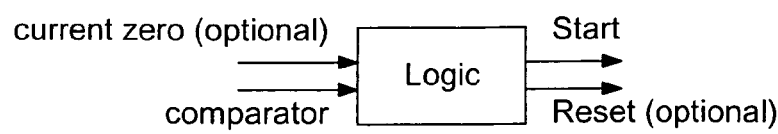
FIGS. 5a–c illustrates developments of current through the charge coil in various scenarios.
Figure 5A:
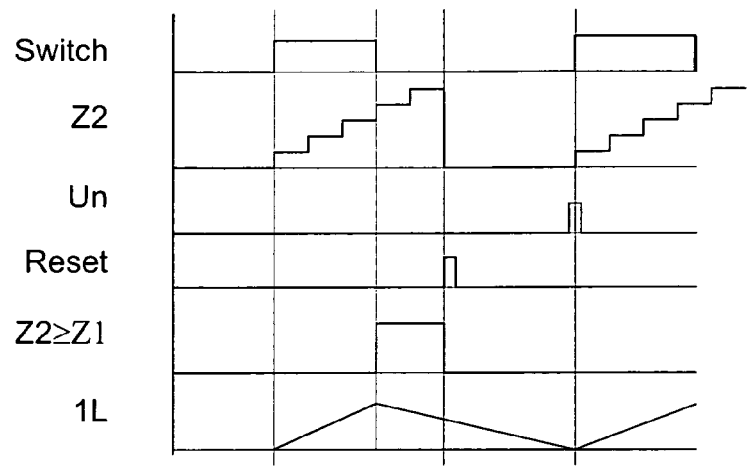
Figure 5B:
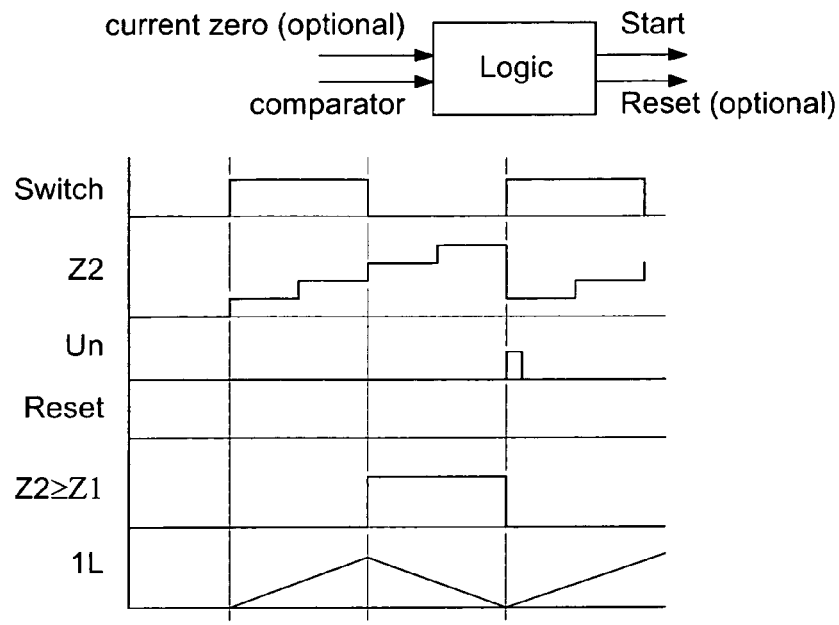
Figure 5C:
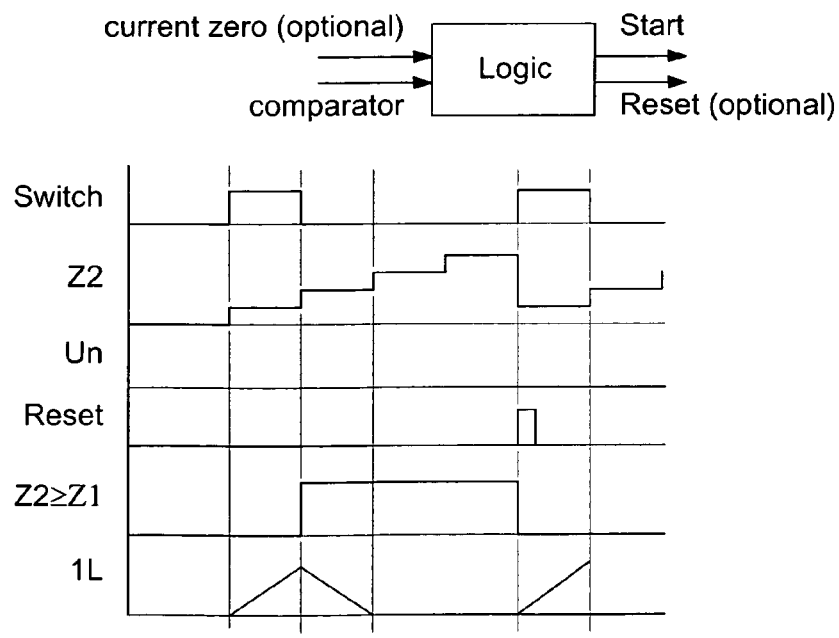

The signal developments thus provided are illustrated in FIGS. 5a–c and will now be explained.

FIG. 5a shows the case that upon detection of the zero crossing of the current through the charge coil the counter Z2 is newly started and the switch S switched-on (signal START). The RESET procedure of the counter Z2 is initiated independently thereof, temporally before the start of the count procedure by means of the signal RESET. This can be effected for example when the logic unit 24 detects that a further counter (not shown), which has the function of a time base, has attained a certain count (highest count). It is to be remarked that the reset procedure is still effected independently and temporally after the switching off of the switch S by means of the comparator 12. The counter Z2 thus runs further upwards for a certain time after the switching off of the switch S.

FIG. 5b shows the case that again upon detection of the zero crossing of the current through the charge coil the counter Z2 is started and the switch S is switched on (signal START). There is no separate RESET and START signal for the counter Z2; rather there is effected in one RESET and start of the counter process of the counter Z2 upon detection of the zero crossing.

FIG. 5c finally shows the case that the counter Z2 is caused to effect a reset procedure and is newly started, and at the same time the switch S is switched-on (signal START) not through detection of the zero crossing of the current through the charge coil but after expiry of a defined time (for example detected by means of a further counter). In this case the switch-on process of the switch S is thus effected at fixed intervals, although the switch-on pulse duration is variable (PWM).

In each case, on the one hand the new start of the second counter Z2 falls together with the switching on of the switch S and on the other hand the switch S is switched off when the compared output signals of the two counters Z1, Z2 attain equality.

Figure 6A:
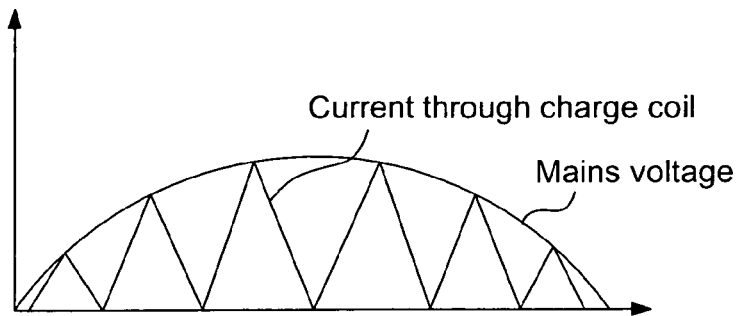
FIGS. 6a–c illustrate various possibilities for starting or resetting the second counter shown in FIGS. 1 and 3.
Figure 6B:
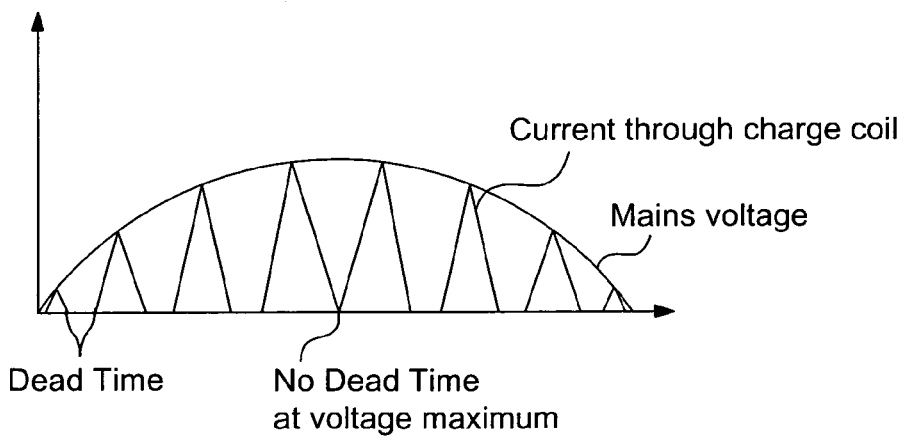
Figure 6C:
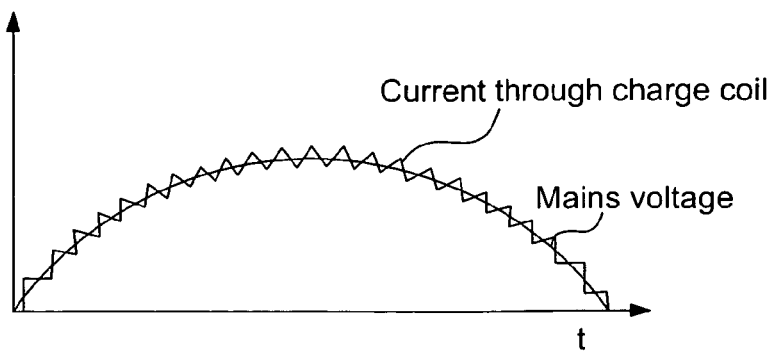

Possible temporal developments of the d.c. current through the charging choke in relation to the mains current is shown in FIGS. 6a–6c.

As shown in FIG. 6a, with employment of the reset signal, the d.c. current through the charging choke again immediately climbs, which is also called "borderline control".

As is shown in FIG. 6b, there can further arise the case that at the time point at which the d.c. current through the choke has already fallen to zero, the second counter Z2 has not yet attained its highest count and the switch remains closed during a dead time, in which dead time no current flows through the choke. This is also called "discontinuous conduction".

On the other hand, there can arise the case, as shown in FIG. 6c, that the counter Z2 reaches its highest count at a time point at which the current through the choke has not disappeared. By means of the appropriate switching of the switch in this case, the d.c. current through the choke never falls to zero. This is called "continuous conduction".

The circuit illustrated in FIG. 3 represents a general illustration of the present invention which in the case of n>1 through the, in comparison to the comparator, greater resolution of the A/D converter 15 opens up the possibility of the taking into account the height of the deviation between the desired value $U_{soll}$ and actual value $U_{ist}$. For the case that the A/D converter 15 is employed as a 1-bit converter and there are selected for the multiplication factors the values $K_1=2$ and $K_2=0$ (the integration member has in this case no function) and as digital reference value 0.5 is selected, there is again obtained the special case of a 1-bit PFC. For the processing of the signal the following then applies:

Insofar as the current actual value $U_{ist}$ of the output d.c. voltage is greater than the desired voltage $U_{soll}$, the 1-bit A/D converter 15 issues the value 1. The value received from the comparison block 18 is then −1+0.5=−0.5. The value calculated by the P member 19 and thus by the input block 17 is in this case −0.5*2=−1, i.e. the counter Z1 counts downwards in the case of a too high value of the output d.c. voltage, through which the switch-on time for the switch S is reduced. If, in contrast, the output d.c. voltage $U_{ist}$ is below the desired voltage $U_{soll}$, the 1-bit A/D converter 15 issues the value zero. The value received from the comparison block 18 is then 0+0.5=+0.5 and the value delivered to the counter Z1 is 0.5*2=1. In this case, the first counter Z1 thus counts upwards. This 1-bit variant thus represents a particularly simple possibility for regulating the output d.c. voltage.

Both in the 1-bit variant and also in general n-bit forms the circuit in accordance with the invention has the advantage that it is of standard digital circuitry components which in line with the object to be achieved allow themselves well to be integrated into ASIC design.

The invention claimed is:

1. An electronic ballast, comprising:
    a DC voltage converter having a timing switch, for generating a regulated output DC voltage, and which can be fed from a DC voltage source;
    an inverter arranged to be fed from the output DC voltage of the DC voltage converter; and
    a regulation circuit to which are delivered a nominal value signal and an actual value signal corresponding to the output DC voltage of the DC converter, and which generates, as setting value signal, switch-on pulses for the timing switch, wherein
    the regulation circuit includes a first counter and a second counter,
    the first counter having a bit width at least equal to the bit width of the second counter,
    the first counter is one with reversible count direction, which counts in either direction in dependence upon whether the actual value signal is greater or smaller than the nominal value signal,
    a comparator is arranged to compare output signals of the two counters for obtaining the setting value signal, and
    a pulse width of the switch-on pulses for the timing switch is determined by a time period between a switch-on signal for the timing switch and a temporally following attainment of equality of count stages compared with one another, whereby at a switch-on time point of the timing switch the second counter carries out a new count procedure.

2. An electronic ballast according to claim 1, wherein the bit width of the first counter is greater than the bit width of the second counter and in the comparator the output signal of the second counter is compared with an output signal of the first counter divided by a scale factor.

3. An electronic ballast according to claim 1, wherein the DC voltage converter is an upward converter having—seen from input to output—a charge coil L in a first series branch, with the switch in a first transverse branch, a diode in a second longitudinal branch and a charge capacitance in a second transverse branch.

4. An electronic ballast according to claim 3, wherein a zero point detector, for the DC current flowing through the charge coil of the DC voltage converter, is connected with a logic unit which brings about a start procedure of the second counter and a simultaneous switching on of the switch as soon as the zero point detector detects a zero crossing of the current through the charge coil.

5. An electronic ballast according to claim 1, wherein a logic unit closes the timing switch after expiry of a predetermined time duration and at the same time causes the second counter to carry out a new start procedure.

6. An electronic ballast according to claim 1, wherein the actual value signal is generated by means of a DC voltage sensor which measures the output DC voltage of the DC voltage converter, in that the actual value signal and the nominal value signal are delivered as analog signals to two inputs of an A/D converter which compares these two signals and generates on the output side a digital value in dependence upon a difference between the actual value signal and the nominal value signal;

the output of the A/D converter is connected with the first counter, and the first counter carries out a count process in dependence upon the output value of the A/D converter.

7. An electronic ballast according to claim 1, wherein a step size of the first counter is variable and depends upon the output value of the A/D converter.

8. An electronic ballast according to claim 7, wherein a digital filter is connected upstream of the first counter.

9. An electronic ballast which includes:

a DC voltage converter, with a clocked switch and a regulated output DC voltage, and which is fed from a DC voltage source;

an inverter arranged to be fed from the output DC voltage of the DC voltage converter; and a regulation circuit to which are delivered a nominal value signal and an actual value signal corresponding to the output DC voltage of the DC converter, and which generates switch-on pulses for the clocked switch, wherein:

a comparator is arranged for comparing the actual value signal with the nominal value signal for generating a digital difference signal, means are provided for comparing the difference signal with a count of a counter, which begins a count process in response to a start or RESET signal, and switch control means are provided for switching on the switch and starting the counter after expiry of a predetermined time or when a current through a charge coil of the DC voltage converter reaches a zero point, and for switching off the switch when a value of a difference signal is equal to the count of the counter.

10. A method for operating an electronic ballast for a gas discharge lamp comprising:

a DC voltage converter having a timing switch, generating a regulated output DC voltage, and being fed from a DC voltage source;

an inverter fed from the output DC voltage of the DC voltage converter; and a regulation circuit to which there is delivered a nominal value signal and an actual value signal corresponding to the output DC voltage of the DC converter, and which generates, as a setting value signal, switch-on pulses for the timing switch, the method comprising the following steps:

comparing the actual value signal with the nominal value signal for generating a digital difference signal, delivering the digital difference signal to a count input of a first counter, a count direction of which depends upon a sign of the digital difference signal, comparing the count, or the scaled count, of the first counter with a count of a second counter, which begins a count process in response to a start or RESET signal, switching on the switch and start of the second counter after expiry of a predetermined time or when a current through a charge coil of the DC voltage converter reaches a zero point and, switching off of the switch when the count or the scaled count of the first counter is equal to the count of the second counter.

11. A method according to claim 10, wherein a bit width of the first counter is greater than a bit width of the second counter, and in that an output signal of the second counter is compared with an output signal of the first counter divided by a scale factor.

12. A method according to claim 10 or 11, wherein the actual value signal is generated by means of a DC voltage sensor which measures the output DC voltage of the DC voltage converter, the actual value signal and the nominal value signal are delivered in analog form to two inputs of an A/D converter which compares these two signals and generates on an output side a digital value in dependence upon the difference between the actual value signal and the nominal value signal, the output of the A/D converter is connected with the first counter, and the first counter carries out a count process in dependence upon the output value of the A/D converter.

13. A method according to claim 10, wherein a step size of the first counter is variable and depends upon the output value of the A/D converter.

14. A method according to claim 10, wherein the digital difference signal is digitally filtered.

15. A method for operating an electronic ballast having a DC voltage converter, with clocked switch and regulated output DC voltage, fed from a DC voltage source, an inverter fed from the output DC voltage of the DC voltage converter, and a regulation circuit to which there is delivered a nominal value signal and an actual value signal corresponding to the output DC voltage of the DC converter, and which generates switch-on pulses for the clocked switch, the method comprising the steps of:

comparing the actual value signal with the nominal value signal for generating a digital difference signal, digital low pass filtering of the digital difference signal, comparing the filtered difference signal with a count of a counter, which begins a count process in response to a start or RESET signal, switching on the switch and start the counter after expiry of a predetermined time or when a current through a charge coil of the DC voltage converter reaches a zero point and, switching off the switch when a value of the filtered difference signal is equal to the count of the counter.

* * * * *